Figure 1:
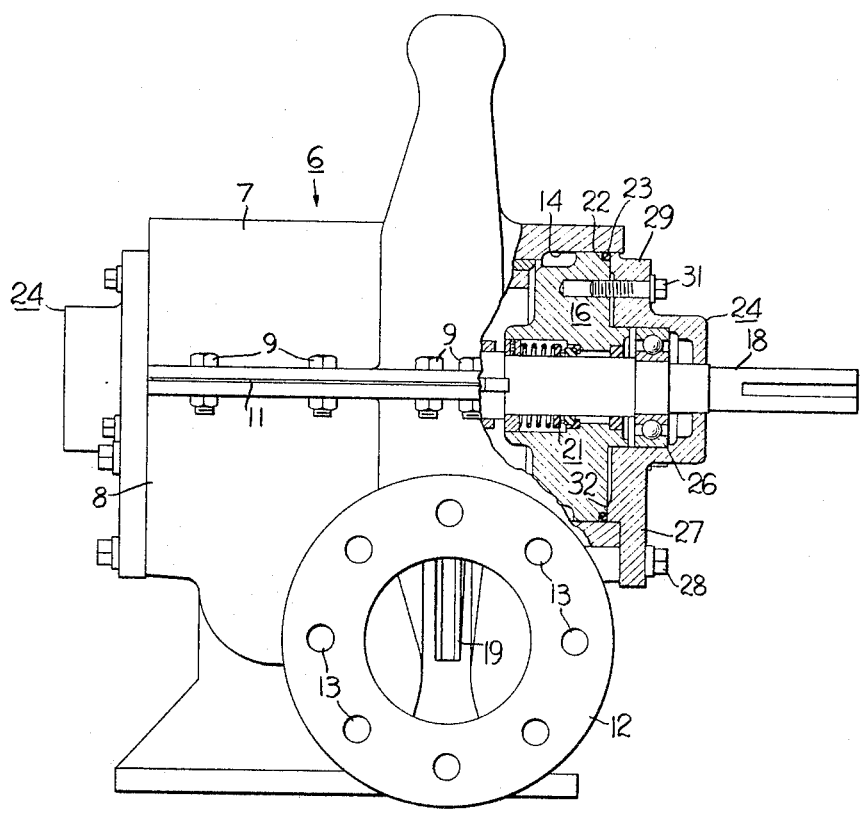

Nov. 1, 1966 J. K. KILBANE ETAL 3,282,221
END SEALING ARRANGEMENT FOR SPLIT CASING PUMP
Filed Oct. 12, 1964

Inventors
John K. Kilbane
Cyril A. Kuknvich
By John P. Hinge
Attorney

United States Patent Office 3,282,221
Patented Nov. 1, 1966

3,282,221
END SEALING ARRANGEMENT FOR SPLIT CASING PUMP
John K. Kilbane, Wauwatosa, and Cyril A. Kukuvich, West Allis, Wis., assignors to Allis-Chalmers Manufacturing Company, Milwaukee, Wis.
Filed Oct. 12, 1964, Ser. No. 403,265
2 Claims. (Cl. 103—111)

This invention pertains to pumps in general and more particularly to an end sealing arrangement for centrifugal type pumps wherein the casing is constructed in two parts and connected together along a longitudinal joint.

Pumps of this character are provided with an impeller, positioned in a pumping chamber within the pump casing, which is rotatably supported by a shaft extending longitudinally through the casing and conventionally in line with the plane of the longitudinal casing joint. The casing is provided with aligned end bores which are closed by end closures attached to the pump casing. The end closures have shaft bores therethrough which contain the shaft packing and the shaft bearings are conventionally attached to the outer face of the end closures.

It is necessary to provide a fluid tight seal about each end closure and the pump casing to seal the pressurized fluid within the pump casing from the atmosphere. In some instances, the end closure is provided with a radially directed flange which is bolted to a machined face on the end of the pump casing. In this type of arrangement a gasket can be provided between the casing and end closures.

In many instances it is desirable to position the end closure within the end bore of the casing for space saving reasons and this requires a different sealing arrangement. In the past, an end closure which is contained within the casing end bores has been provided with one or more annular grooves in the periphery of the end closure and sealing members such as O-rings in these grooves provide a seal between the interior of the pump and the atmosphere. The continued use of the term O-ring should not be taken as a limitation to the scope of the invention and is merely conveniently used as one familiar type of sealing member which could be employed. In either sealing arrangement it all too frequently occurs that a gap is left between the longitudinal seal gasket and either the O-ring or the end gasket. This gap may be caused by either an imperfection in the manufacture of the gaskets or because of improper positioning of the gasket during assembly of the pump. Whatever the cause, the result is an imperfect seal.

An additional difficulty results when the end closure is contained within the end bore of the split casing pump. As is common with all O-ring applications, the ring diameter must be slightly larger than the outside diameter of the surface to be sealed. In the instant example, the O-ring must be slightly larger than the outside diameter of the end closure so that sufficient sealing pressure is exerted on the O-ring when the casing halves are bolted together. Since the O-ring is slightly oversized and must be positioned in the annular peripheral groove, prior to assembly of the casing halves, it quite frequently occurs that a portion of the O-ring is squeezed into the longitudinal joint between the casing halves, thereby preventing a proper seating of the casing longitudinal seal gasket and also resulting in an imperfect seal.

The shortcomings of the above described sealing methods were overcome by the invention described and claimed in U.S. application Serial No. 227,851, filed October 2, 1962, now U.S. Patent No. 3,160,107. In that invention the O-ring seal is placed in a groove defined by the casing halves and the end closure and which groove is longitudinally open to the end of the pump so the O-ring can be inserted after the casing halves and end closures are assembled. A pressure ring is then connected to the end closures covering the annular grooves and forcing the O-rings into sealing engagement with the casing halves and the end closures. The shaft bearings supported in housings connected to the end closures within the periphery of the pressure ring.

This invention is an improvement of the invention of U.S. Serial No. 227,851, now U.S. Patent No. 3,160,107. The main object of the subject invention is to provide an end sealing arrangement for a pump of the hereinbefore described type wherein the O-ring is forced into sealing engagement with the inner and outer peripheral surfaces of the casing and end closures.

A more specific object of the subject invention is to provide an end closure arrangement for a pump of the hereinbefore describde type wherein the shaft bearing housings are attached to both the end closures and a casing half to maintain these elements in their proper assembled positions.

Figure 2:
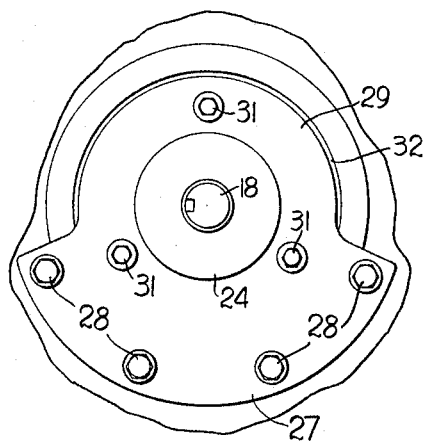

These and other objects of the subject invention will become more fully apparent as the following description is read in light of the attached drawing, wherein:

FIG. 1 is a side elevation partly in section of a pump constructed in accordance with the invention; and FIG. 2 is a partial end view of FIG. 1.

Referring to the drawing, the pump generally designated 6 is comprised of an upper casing half 7 and a lower casing half 8. Each casing half may be provided with a longitudinally disposed flange having aligned bolt holes therethrough in which are received bolts 9 to connect the casing halves together. A seal gasket 11 is provided between the casing halves to seal the interior of the pump along the longitudinal joint from the atmosphere. The pump is provided with a conventional exhaust flange 12 which may be cast as an integral part of the lower casing half 8. This flange may be provided with circumferentially spaced mounting holes 13.

Since both ends of the pump are substantially identical, only one end has been broken away to show the construction thereof. Each end of the pump is provided with an end bore 14 which is defined by the casing halves 7 and 8 and into which is received an end closure generally designated 16. A shaft bore through the end closure 16 receives the pump shaft 18 to which is rigidly connected a conventional pump impeller 19. A counterbore in the end closure coaxial with the shaft bore receives a conventional mechanical seal generally designated 21.

The outer peripheral surface of the end closure 16 may be provided with an annular shoulder 22. When the end closure is positioned in the end bore 14, as is shown in the drawing, this annular shoulder 22 and the inner peripheral surface of the casing halves 7 and 8 define an annular groove. An O-ring or similar sealing member 23 is contained in this annular groove.

A bearing housing generally designated 24 is provided at each end of the pump casing. These housings support shaft bearings 26. Each bearing housing is provided with a lower arcuate flange 27 which mates with the end surface of the lower casing half 8. The flange is provided with a plurality of arcuately spaced openings which receive cap screws 28. The cap screws 28 are threaded into bores tapped in the end surface of the lower casing half 8. This connection holds the bearing housing securely to the pump casing.

The upper half of bearing housing 24 is also constructed to form an arcuate flange 29, however of smaller radius than the flange 27. The upper flange 29 is provided with a plurality of arcuately spaced openings which receive cap screws 31. These cap screws are threaded into tapped bores provided in the mating end surface of end closure 16. In this manner the end closure 16 is rigidly held to the bearing housing 24 which in turn is securely fastened to the lower pump casing half 8. With this novel connection it is possible to remove the bearing housing 24, bearing 26, end closure 16, and mechanical seal 21 without removing the upper casing half 7. Also this connection overcomes the necessity of providing expensive tongue and groove machining in the mating surfaces of the pump casing and end closure.

The bearing housing 24 is provided with an annular shoulder 32 which fits within the interior of the pump as defined by the upper and lower casing halves. This annular shoulder engages the O-ring 23 to force it into fluid sealing engagement with the joint between the end closure and the interior surface of the pump. With this arrangement, it can be seen that a simplified sealing connection is provided between the pump, the end closure and the bearing housing.

Although only one embodiment of the subject invention has been described and shown herein, it will be obvious to those skilled in the art after reading this disclosure that various modifications of the invention can be employed which incorporate the spirit of the invention disclosed and it is intended to cover such modifications as come within a reasonable interpretation of the claims appended hereto.

The embodiments of the invention in which an exclusive property or privilege is claimed are defined as follows:

1. In a pump the combination comprising: a casing having axially spaced aligned end bores, said casing constructed of a pair of sections releasably connected along a longitudinal joint; a pair of end closures in said end bores combining with the inner peripheral surface of said bores to form continuous annular grooves therebetween, said grooves being open in the axially outward direction; a sealing element in said grooves; and a pair of bearing housings each having a flange connected to one of said casing sections and to said end closures to hold said housings, pump casing and end closures against relative movement, said bearing housings being free of connection to said other of said pair of casing sections whereby said other casing section may be removed without removing said end closures or said bearing housings.

2. The combination set forth in claim 1 wherein said bearing housing has an axially directed annular flange thereon forcing said sealing element into fluid sealing engagement with said inner peripheral surface of said bores and said end closures.

References Cited by the Examiner

UNITED STATES PATENTS

| | | | |
|---|---|---|---|
| 2,658,775 | 11/1953 | Murphy | 103—111 |
| 2,661,698 | 12/1953 | Schellens | 103—104 |
| 2,865,539 | 12/1958 | Edwards | 103—111 |
| 3,160,107 | 12/1964 | Ross | 103—104 |
| 3,167,021 | 1/1965 | Sence | 103—111 |

FOREIGN PATENTS 638,713   3/1962   Canada.

MARTIN P. SCHWADRON, *Primary Examiner.*

HENRY F. RADUAZO, *Examiner.*